(12) United States Patent
Ross

(10) Patent No.: US 6,817,815 B2
(45) Date of Patent: Nov. 16, 2004

(54) FASTENER BEING PRESSABLE INTO A METAL SHEET IN A WAY SAFE AGAINST ROTATION AND PRESSING OUT

(75) Inventor: Gerold Ross, Bendorf (DE)

(73) Assignee: Textron Verbindungstechnik GmbH & Co., Ltd., Neuwied (DE)

( * ) Notice: Subject to any disclaimer, the term of this patent is extended or adjusted under 35 U.S.C. 154(b) by 0 days.

(21) Appl. No.: 10/336,178

(22) Filed: Jan. 2, 2003

(65) Prior Publication Data

US 2003/0108400 A1 Jun. 12, 2003

Related U.S. Application Data

(63) Continuation of application No. 09/901,984, filed on Jul. 10, 2001.

(30) Foreign Application Priority Data

Jul. 12, 2000 (DE) ................................. 200 12 097 U

(51) Int. Cl.[7] ............................................... F16B 37/04
(52) U.S. Cl. ........................ 411/180; 411/188; 411/107
(58) Field of Search ........................ 411/179–181, 184, 411/187, 188, 107

(56) References Cited

U.S. PATENT DOCUMENTS

| | | | |
|---|---|---|---|
| 3,127,919 A | 4/1964 | Swanstrom | |
| 3,640,326 A | 2/1972 | Brown | |
| 3,770,037 A | 11/1973 | Ernest | |
| 3,782,436 A | 1/1974 | Steiner | |
| 3,967,669 A | 7/1976 | Egner | |
| 4,637,766 A | 1/1987 | Milliser | |
| 4,940,375 A | 7/1990 | Marvell et al. | |
| 5,513,933 A | 5/1996 | Rom | |
| 5,528,812 A | * | 6/1996 | Muller ...................... 29/432.2 |
| 5,797,175 A | 8/1998 | Schneider | |
| 6,220,804 B1 | * | 4/2001 | Pamer et al. ............... 411/180 |

FOREIGN PATENT DOCUMENTS

| | | |
|---|---|---|
| DE | 42 03 153 A1 | 7/1993 |
| DE | 44 10 475 A1 | 9/1995 |
| DE | 195 35 537 A1 | 3/1997 |
| EP | 0 398 025 A1 | 11/1990 |
| WO | WO 94 / 01688 | 1/1994 |
| WO | WO 95 27147 A Y | 10/1995 |
| WO | WO 98 / 51934 | 11/1998 |

OTHER PUBLICATIONS

EPO Search Report dated Sep. 23, 2002 for Textron Verbindungstechnik Patent Application No. 01116818.4–2424.

* cited by examiner

*Primary Examiner*—Flemming Saether
(74) *Attorney, Agent, or Firm*—Domingue & Waddell, PLC

(57) ABSTRACT

A fastener (10) being pressable into a metal sheet in a way safe against rotation and pressing out having a head (12), the side of which after insertion facing the metal sheet is having radially positioned ridges (22), which, when setting the fastener (10), are pressed into the metal sheet, wherein a cylindrical thread-carrier (14) is positioned in the centre of said ridges (22) projecting through the metal sheet beyond the other side of the metal sheet and which in the vicinity of the side of the head (12) facing the metal sheet in the set state is having a surrounding annular recess (20) into which the material of the metal sheet displaced during the setting can be pressed.

1 Claim, 5 Drawing Sheets

FASTENER BEING PRESSABLE INTO A METAL SHEET IN A WAY SAFE AGAINST ROTATION AND PRESSING OUT

This application is a continuation of application Ser. No. 09/901,984 filed 10 Jul. 2001.

BACKGROUND OF THE INVENTION

The present invention relates to a fastener which is pressable into a metal sheet in a way safe against rotation and pressing out, having a head or ring the side of which after insertion facing the metal sheet has radially positioned ridges, which, when setting the fastener, are pressed into the metal sheet, wherein a cylindrical thread-carrier is positioned in the center of said ridges projecting through the metal sheet beyond the other side of the metal sheet and which in the vicinity of the side of the head or ring facing the metal sheet in the set state has an annual recess into which the material of the metal sheet displaced during the setting can be pressed.

Such fasteners can be performed as bolts (having a shaft with an exterior thread) as well as nuts (having a through bore with an interior thread). A corresponding fastener for example is known from WO 94/01688.

Similar constructions for example are known from DE 44 10 475 A1, DE 195 35 537 A1 and WO 98/51934.

In all these known fasteners, the problem exists that these cannot be used with a metal sheet whose thickness is 1 mm or less or can be used only with a decreased function since the corresponding safety against rotation and pressing out is no longer obtained.

Accordingly, it is the task to be solved by the present invention to improve such a fastener in such a way that the fastener can be used with metal sheets having a thickness of an even below 1 mm and still achieve sufficient safety against rotation and pressing out without the necessity of a special preparation of the opening into which the fastener should be set. In solutions as e.g. according to DE 44 10 475 A1 or WO 94/01688 around the opening for setting a so-called "collar" of metal sheet has to be formed to achieve a sufficient safety against rotation and pressing out with thinner metal sheets. This necessitates in a disadvantageous way a further procedural step to form the corresponding "collars".

According to the state of art until now one has assumed that an optimal safety of the fastener against rotation and pressing out is achieved if in the vicinity of the thread-carrier as much space as possible is provided to receive the metal sheet material. With thinner metal sheets however not sufficient material of the metal sheet is present to fill such spaces. According to the prior art therefore auxiliary constructions have been used as for example the "collar" from the WO 94/01688.

SUMMARY OF THE INVENTION

Contrary to the above, the present invention starts out from the fact that, for achieving an optimal safety against rotation and pressing out with thinner metal sheets, not too much space for the displaced material of the metal sheet should be provided but only that volume, which by a deliberate deformation (flowing) of the metal sheet, can be filled in an optimal way. This shaping into the annular recess is achieved by a flow shaping of the metal sheet material caused by the special shape of the ridges.

According to the invention, the above task is solved by the features that the ridges over a majority of their radial extension have a constant height and width and in the vicinity of the thread-carrier smoothly merging with the same with an increasing width.

By such a construction even with very thin metal sheets, a sufficient safety against rotation and pressing out of the fastener is achieved.

For a further improvement of the safety against rotation according to the invention it is preferred that the ridges have a basically rectangular cross-section and their side wall are perpendicular to the side of the head facing the metal sheet. By this, the grip of the ridge in the metal sheet material is further improved.

To achieve a close contact of the head on the metal sheet and thereby to avoid the formation of gaps it is useful if the ridges in the radial exterior area taper off in a flat manner.

For this purpose, it is of advantage, too, if the ridges in the radial exterior area taper off sidewardly in a rounded manner.

BRIEF DESCRIPTION OF THE DRAWINGS

In the following, the invention is more detailedly explained on the basis of two exemplary embodiments shown in the drawings. The drawings show.

DETAILED DESCRIPTION OF THE DRAWINGS

Figure 1:
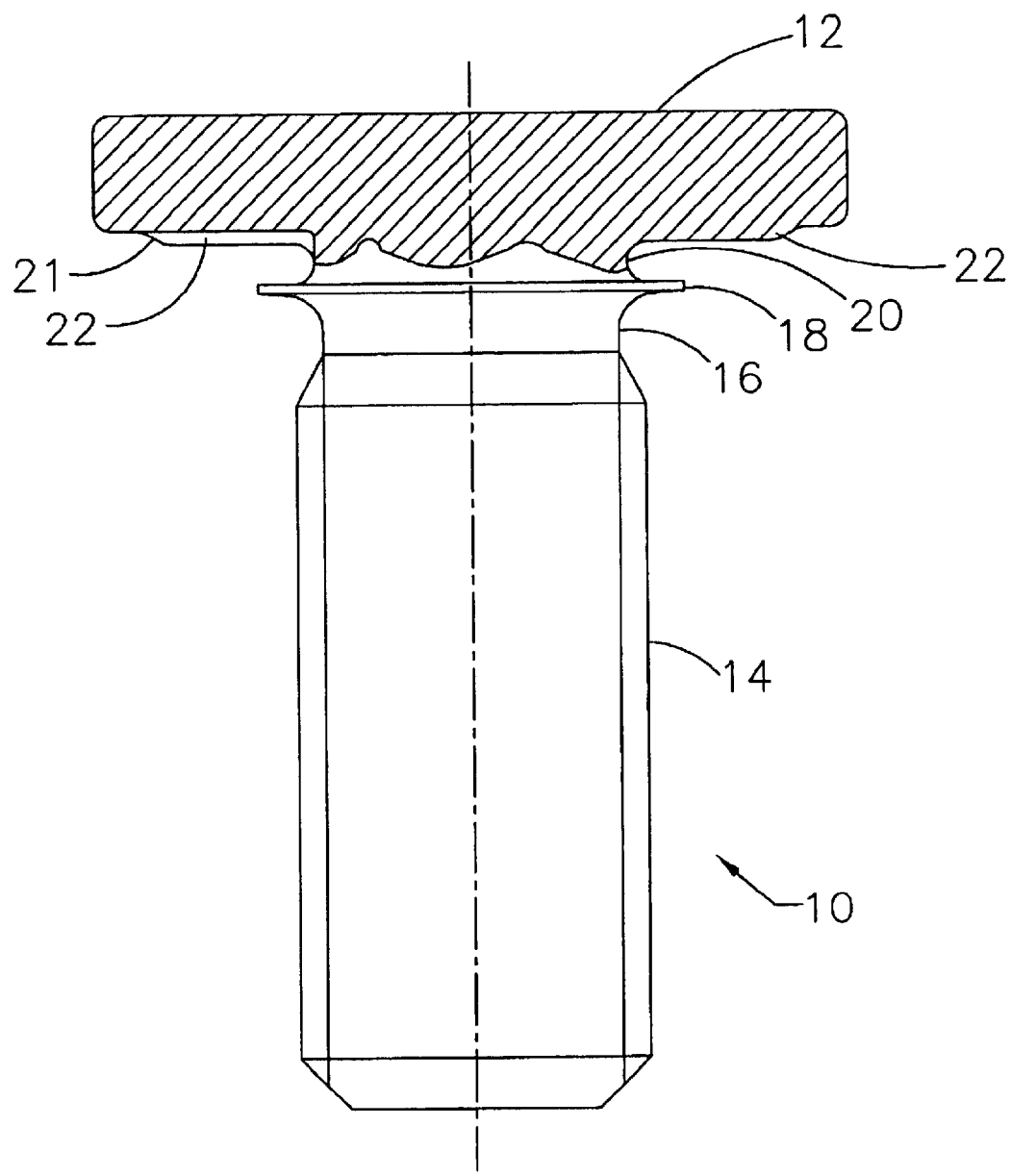
FIG. 1 a side view of a fastener as a bolt according to the invention.

FIG. 1 shows the fastener according to the invention in the form of a bolt, i.e. having a shaft with an exterior thread. The fastener 10 according to the invention has a head 1 and a shaft 14 carrying an exterior thread. Between the thread and the head 12 in the following order there are provided a calibration collar 16, an annular projection 18 and an annular groove 20 having a generally semi-circular cross-section. On the bottom side of the head 12, which is facing the metal sheet during the setting of the fastener, there are provided radially extending ridges 22, which in their radial extension generally have a constant height and which taper off in a flat manner merely in their radial exterior area 21.

The head 12 is shown partly in cross-section, wherein, on the right side, the corresponding ridge 22, too, is shown in cross-section while the corresponding ridge 22 on the left side is shown in front view.

Figure 2:
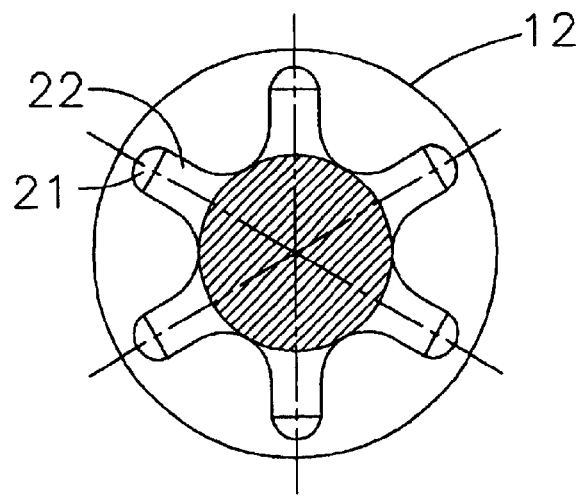
FIG. 2 the fastener according to FIG. 1 in a bottom view, wherein the shaft is cut-off in the plane of the annular recess.

FIG. 2 shows the head 12 of the fastener of FIG. 1 in a bottom view, wherein the shaft is cut-off in the plane of the annular groove 20. In FIG. 2, the shape of the ridges 22 is especially well shown. The ridges 22 extend in a radial direction with a generally constant width and merely in the radial exterior area 21 near the exterior edge of the screw head 12 taper off in their height in a flat manner and are rounded in their width. In the direction of the shaft 14, the ridges 22 in a rounded manner are merging with the annular groove 20.

Figure 3:
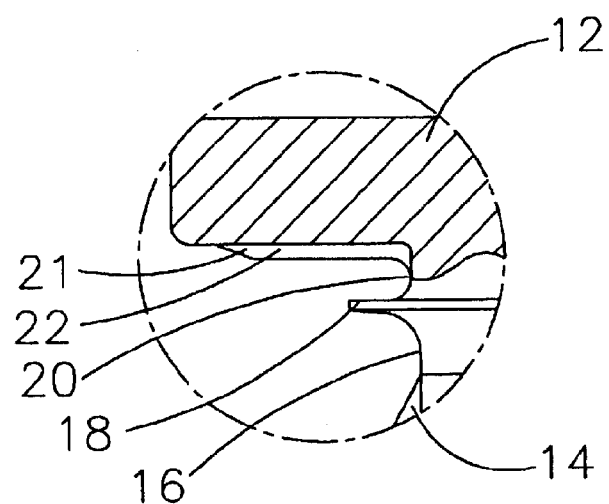
FIG. 3 a detailed view of the annular recess and the ridges of the fastener according to FIG. 1.

FIG. 3 shows a detailed representation of the merger area between the head 12 and the thread-carrier 14. In FIG. 3, the tapering off of the ridge 22 in the exterior area 21 is specially detailedly shown.

Figure 4:
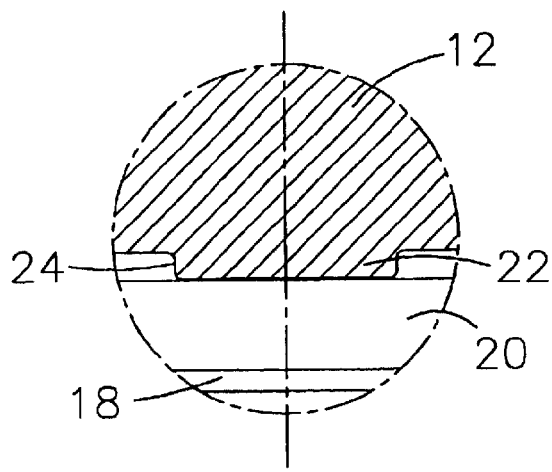
FIG. 4 a cross-sectional view of one ridge of the fastener according to FIG. 1, wherein the cross-section is across the longitudinal extension of the ridge.

FIG. 4 shows a detail, namely, the cross-section of a ridge 22, the section being across the radial direction of the head 12. In this view, it is extremely well shown how the ridges 22 are shaped in their cross-section. The ridges 22 generally have a flat rectangular cross-section and are limited by sidewalls 24 generally perpendicular to the level of the head 12. Apart from that, the surface of the ridges 22 facing the metal sheet during the setting generally are even and parallel to the plane of the head 12.

Figure 5:
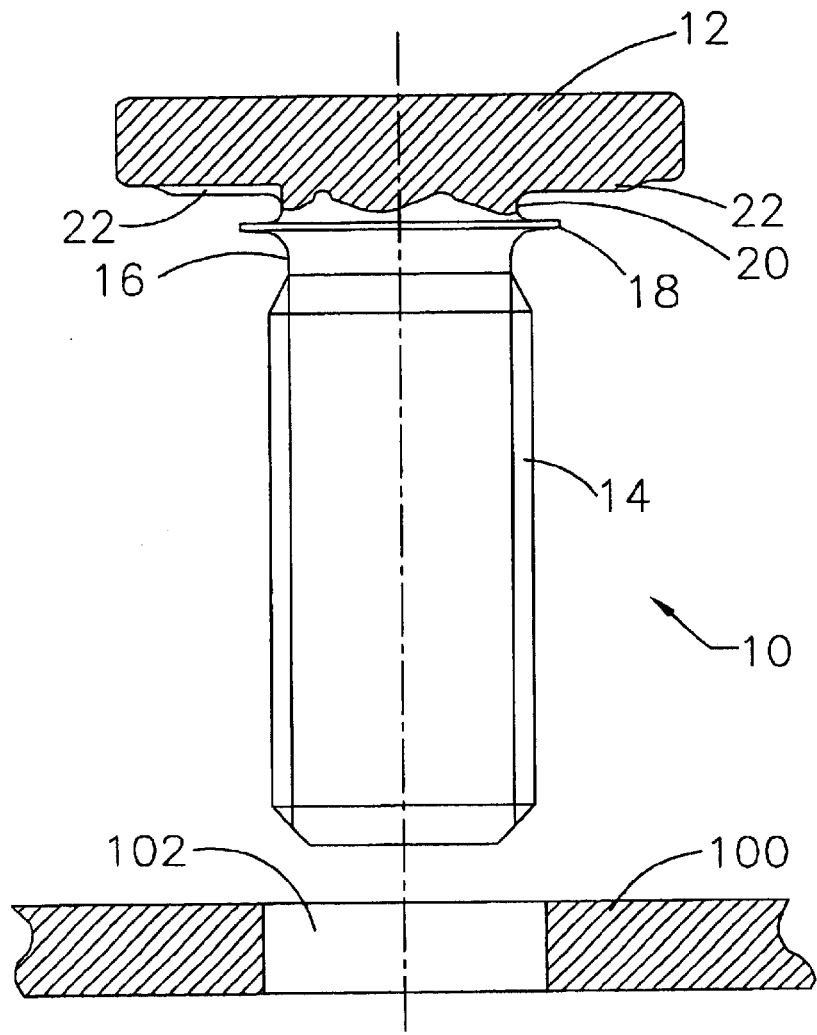
FIG. 5 the fastener according to FIG. 1 shortly before being set in the metal sheet.

FIG. 5 shows the fastener according to FIG. 1 shortly before the insertion into a metal sheet 100 having a corresponding opening 102. The diameter of the opening 102 is chosen such that the fastener can be inserted with the annular projection 18 just without contact.

Figure 6:
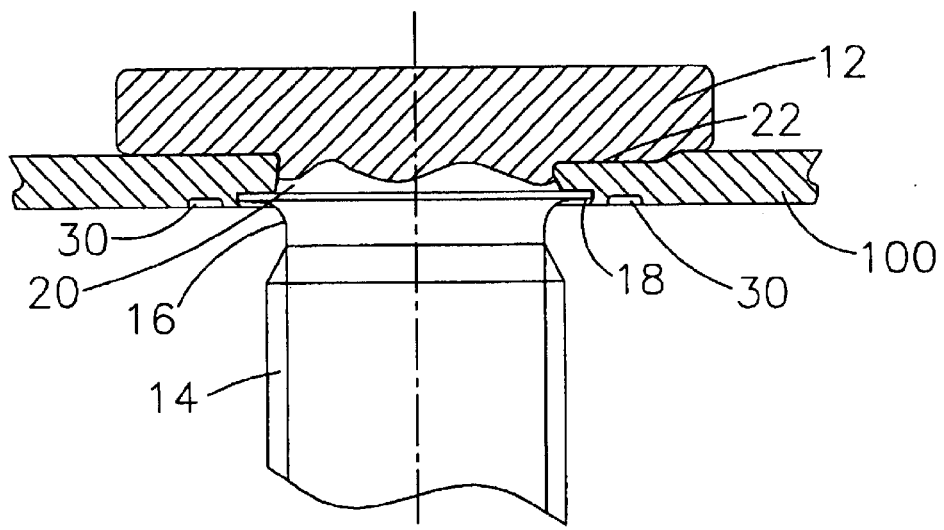
FIG. 6 the fastener according to FIG. 1 after setting in the metal sheet.

In FIG. 6 the indentations 30 caused by the counter tool during the setting are clearly shown. In the same clear way it is shown how the annular groove 20 in the area of a ridge has been filled completely with the displaced material of the metal sheet (right side in FIG. 6) while on the left side in FIG. 6 it is shown that in the area where there is no ridge 22 the annular recess 20 almost completely has been filled with the displaced material of the metal sheet.

The indentations 30, because of the embodiment of the ridges 22 according to he invention and because of the geometry of the annular recess, can be formed in such a flat manner that no substantial decrease of the stiffness of the metal sheet occurs, even with metal sheets having a very small thickness.

Figure 7:
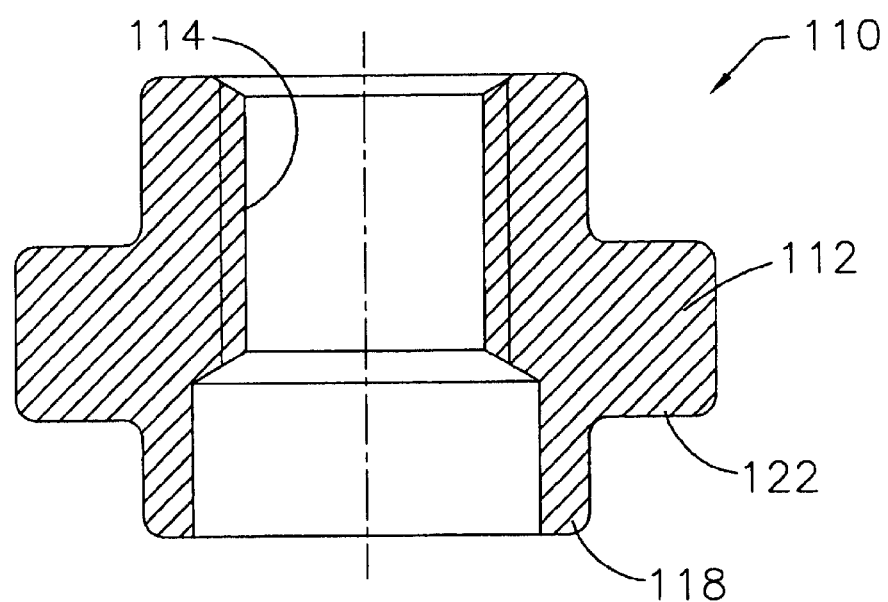
FIG. 7 a further embodiment according to the invention being performed as a nut, i.e. having an interior thread.

FIG. 7 shows a further embodiment of the invention, wherein in this case the invention has been performed with a fastener serving as a nut, i.e. a fastener having an interior thread.

This further fastener 110 according to the invention serves as a pressable nut and basically has a cylindrical shape. In the center, the fastener has a broad surrounding ring 1 2. In the center of the cylindrical fastener 110 there is a throughbore which at least over a part of the height of the fastener 110 forms a thread-carrier 114 with an interior thread. Below the surrounding ring 112, the central bore is increased in diameter, which means that in this area only a relatively thin annular surrounding ridge 118 is present.

The fastener 110 according to the invention is meant to be inserted with the ridge 118 first into a hole in a metal sheet 110. On the side of the surrounding ring 112 facing the metal sheet 100 in the set state, i.e. on the underside thereof, here, too, there are provided ridges 122 the shape of which is the same as the shape of the ridges 22 in the embodiment according to FIG. 1.

Figure 8:
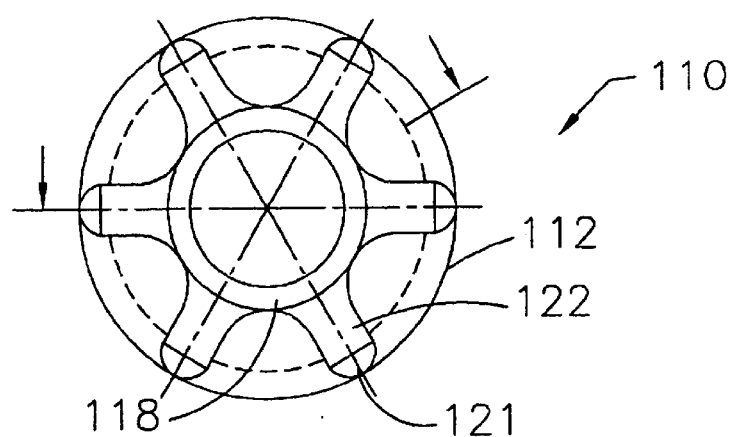
FIG. 8 the fastener according to FIG. 7 in a bottom view (i.e. seen from the side of the metal sheet), and FIG. 9 the fastener according to FIG. 7 partly in section in the state set in a metal sheet.

The shape and the position of the ridges 122 can be more clearly describe with reference to FIG. 8, which shows the fastener of FIG. 7 from below. Here, too, the radially extending ridges 122 in their radial direction have a basically constant width. Merely in the radially exterior area 122 they are rounded in their width and tapering off in their height. Apart from that the same representation of the cross-section is valid for the ridges 122 as shown for the ridges 22 in FIG. 4. They therefore have a basically flat surface directed downwardly and parallel to the level of the ring 112 and sidewalls basically perpendicular thereto. Merely in the direction of the ring 118, i.e. to the interior, the ridges 122 in a rounded manner are merging with said ring, which means that they have a rounded increase of their width in the radially interior area.

The bottom side of the ring 112 in the direction to the interior can be slightly recessed such that in this area the bottom side of the ring 112 is not horizontal but slightly concave.

Figure 9:
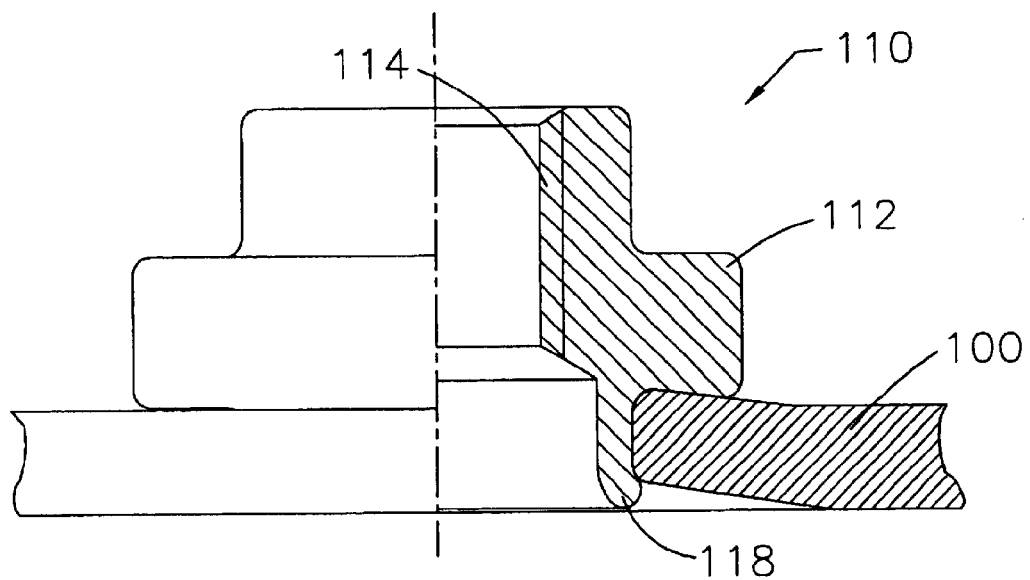

FIG. 9 shows the fastener of FIG. 7 in the set state. The fastener 110 is pressed into a hole in the metal sheet 100 having a corresponding diameter. In this connection, the hole in the metal sheet 100 should have a diameter which makes it possible to insert the fastner 110 with the surrounding ridge 118 just without contact in the hole 102. During the setting, the surrounding ridge 118 by a suitable counter tool is pressed to the exterior whereby the metal sheet is displaced into the edge between the surrounding ridge 118 and the ring 112 and between the corresponding ridges 122. Thereby here, too, a corresponding safety against rotation and pressing out is achieved. In this case, too, the shape of the ridges 122 is of fundamental importance to achieve a complete filling of the space between the surrounding ridge 118 and the ring 112 even when setting the fastener according to the invention in a very thin metal sheet 100.

What is claimed is:

1. A self-clinching fastener of the type for connection to a section of thin sheet material having an aperture formed therein for receiving said fastener, said self-clinching fastener comprising:
   a head portion;
   a shank portion having a smaller outer diameter than said head portion and extending axially from one side of said head portion;
   a plurality of radially outwardly extending ridges extending axially from said one side of said head portion, and radially surrounding and extending radially outward of said shank portion, said ridges extending from said shank portion and having a generally rectangular cross-section with their side walls perpendicular to the surface of the head facing the sheet material, said ridges tapering off in a flat manner in the radial exterior region thereof;
   an annular groove having a semi-circular cross-section located only where said ridges meet said shank portion;
   said annular groove extending axially away from said head portion and radially surrounding said shank portion, and wherein in the direction of said shank, said ridges merge in a rounded manner with said annular groove to form said semi circular cross-section with, a generally annular projection formed about said shank portion, axially spaced from said one side of said head portion, said annular projection having an outer diameter equal to or less than the outer diameter of said shank portion and greater than an inner diameter of said annular groove, and wherein said outer diameter of said annular projection is less than the inner diameter of said aperture.

* * * * *

UNITED STATES PATENT AND TRADEMARK OFFICE
CERTIFICATE OF CORRECTION

PATENT NO. : 6,817,815 B2
APPLICATION NO. : 10/336178
DATED : November 16, 2004
INVENTOR(S) : Gerold Ross It is certified that error appears in the above-identified patent and that said Letters Patent is hereby corrected as shown below:

(1) At column 1, line 36, delete "an" and change to and --and--.

(2) At column 1, line 45, delete "collars" and change to --collar--.

(3) At column 2, line 51, delete "1" and change to --12--.

(4) At column 3, line 10, delete "specially" and change to --especially--.

(5) At column 3, line 28, after the term "ridge", add the numeral --22--.

(6) At column 3, line 47, delete the numeral "1 2" and change to --112--.

(7) At column 3, line 63, delete "describe" and change to --described--.

(8) At column 4, line 19 delete "fastner" and change to -- fastener --.

(9) In Claim 1, column 4, line 42, delete "outward" and change to -- outwardly --.

Signed and Sealed this

Twenty-seventh Day of February, 2007

JON W. DUDAS
*Director of the United States Patent and Trademark Office*